United States Patent
Jung et al.

(10) Patent No.: US 10,658,113 B2
(45) Date of Patent: May 19, 2020

(54) CERAMIC DIELECTRIC AND CERAMIC ELECTRONIC COMPONENT AND DEVICE

(71) Applicant: SAMSUNG ELECTRONICS CO., LTD., Suwon-si, Gyeonggi-do (KR)

(72) Inventors: Doh Won Jung, Seoul (KR); Chan Kwak, Yongin-si (KR); Tae Won Jeong, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 42 days.

(21) Appl. No.: 16/203,934

(22) Filed: Nov. 29, 2018

(65) Prior Publication Data
US 2020/0027659 A1 Jan. 23, 2020

(30) Foreign Application Priority Data
Jul. 23, 2018 (KR) .......................... 10-2018-0085336

(51) Int. Cl.
*H01G 4/12* (2006.01)
*C04B 35/495* (2006.01)
*H01G 4/30* (2006.01)

(52) U.S. Cl.
CPC .......... *H01G 4/1254* (2013.01); *C04B 35/495* (2013.01); *H01G 4/30* (2013.01)

(58) Field of Classification Search
CPC ............................ C04B 35/495; H01G 4/1254
See application file for complete search history.

(56) References Cited

U.S. PATENT DOCUMENTS

| | | | |
|---|---|---|---|
| 5,512,524 A * | 4/1996 | Negas | ................ C04B 35/4686 501/138 |
| 5,552,355 A | 9/1996 | Cava | |
| 6,528,445 B1 * | 3/2003 | Hong | .................... C04B 35/495 501/136 |
| 6,867,452 B2 | 3/2005 | Hayashi et al. | |
| 8,114,307 B2 | 2/2012 | Aoki et al. | |
| 9,487,445 B2 | 11/2016 | Natsui et al. | |
| 2019/0371487 A1* | 12/2019 | Jung | .................... H01G 4/1236 |

FOREIGN PATENT DOCUMENTS

| | | |
|---|---|---|
| JP | 4487371 A | 12/1984 |
| JP | 3530319 B2 | 5/2004 |
| JP | 2008263158 A | 10/2008 |
| JP | 5943144 B2 | 6/2016 |
| KR | 20140003189 A | 1/2014 |

OTHER PUBLICATIONS

A. A. Ballman et al., "The Growth and Properties of Strontium Barium Metaniobate, Sr1—XBaxNb2O6, A Tungsten Bronze Ferroelectric", Journal of ccrystal Growth 1, May 29, 1967, pp. 311-314, vol. 1, North-Hlland Publishing Co., Amsterdam.

(Continued)

*Primary Examiner* — Karl E Group
(74) *Attorney, Agent, or Firm* — Cantor Colburn LLP (57) ABSTRACT

Disclosed are a ceramic dielectric including a composite of a first dielectric and a second dielectric, wherein each of the first dielectric and the second dielectric includes strontium (Sr) and niobium (Nb) and has a different crystal system, a ceramic electronic component, and a device.

20 Claims, 7 Drawing Sheets

(56) References Cited

OTHER PUBLICATIONS

Dowan Kim et al., "Dielectric properties and temperature stability of BaTiO3 co-doped La2O3 and Tm2O3", Current Applied Physics, Dec. 24, 2011, pp. 952-956, vol. 12.

Taras Kolodiazhnyi et al., "Superconductivity and crystal structural origins of the metal-insulator transition in Ba6—xSrxNb10O30 tetragonal tungsten bronzes", Physical Review B, Dec. 14, 2015, pp. 214508-1~214508-11, 2015 American Physical Society, vol. 92.

\* cited by examiner

CERAMIC DIELECTRIC AND CERAMIC ELECTRONIC COMPONENT AND DEVICE

CROSS-REFERENCE TO RELATED APPLICATION

This application claims priority to and the benefit of Korean Patent Application No. 10-2018-0085336 filed in the Korean Intellectual Property Office on Jul. 23, 2018, and all the benefits accruing therefrom under 35 U.S.C. § 119, the entire content of which is incorporated herein by reference.

BACKGROUND

1. Field

A ceramic dielectric, a ceramic electronic component, and a device are disclosed.

2. Description of the Related Art

An exemplary electronic component using ceramic includes various elements such as a capacitor, an inductor, a piezoelectric device, a varistor, or a thermistor, etc. Among the various elements, a capacitor is an important component for use in an electronic circuit and is an electronic component used for storing capacitance. A multi-layer ceramic capacitor ("MLCC"), which is one example of a capacitor, includes a plurality of capacitors and is formed in, for example, a chip shape, so that the MLCC may be disposed (e.g., mounted) in a flexible printed circuit ("FPC") of various electronic devices such as an image device of a liquid crystal display (LCD), a computer, a mobile phone, and the like, and a vehicle device such as an electric vehicle and a smart car to charge and discharge electricity, and the MLCC may be used in a device for coupling, decoupling, or impedance matching, and the like.

SUMMARY

An embodiment provides a ceramic dielectric having a high dielectric constant and thermal stability.

An embodiment provides a ceramic electronic component including the ceramic dielectric.

An embodiment provides a device including the ceramic electronic component.

According to an embodiment, a ceramic dielectric includes a composite comprising a first dielectric and a second dielectric, wherein each of the first dielectric and the second dielectric includes strontium (Sr) and niobium (Nb) and has a different crystal system.

The first dielectric may have a tetragonal system and the second dielectric may have an orthorhombic system.

The first dielectric may comprise, or be represented by $Sr_{1-a}Ba_aM_bNb_2O_6$ or $Sr_{6-c}Ba_cM_dNb_{10}O_{30}$ and the second dielectric may comprise, or be represented by $Sr_{2-2e}Ba_{2e}M_fNb_2O_7$, wherein each M is independently at least one metal or semi-metal other than strontium (Sr), barium (Ba), and niobium (Nb), $0 \leq a < 0.5$, $0 \leq b \leq 3$, $0 \leq c \leq 3$, $0 \leq d \leq 3$, $0 \leq e < 0.5$, and $0 \leq f \leq 3$.

M may include cobalt (Co), nickel (Ni), copper (Cu), zinc (Zn), manganese (Mn), magnesium (Mg), aluminum (Al), iron (Fe), scandium (Sc), gallium (Ga), lanthanum (La), yttrium (Y), bismuth (Bi), dysprosium (Dy), neodymium (Nd), samarium (Sm), holmium (Ho), cerium (Ce), europium (Eu), gadolinium (Gd), terbium (Tb), erbium (Er), thulium (Tm), ytterbium (Yb), ruthenium (Lu), or a combination thereof.

The first dielectric comprises, or may be represented by $Sr_{1-a}Ba_aNb_2O_6$ or $Sr_6Nb_{10}O_{30}$ and the second dielectric comprises, or may be represented by $Sr_2Nb_2O_7$.

The first dielectric and the second dielectric may be present in a mole ratio of about 50:50 to about 90:10.

A Curie temperature of the composite may not be in a temperature range of about −55° C. to about 200° C.

A variation of a dielectric constant of the composite may be less than or equal to about 25% in a temperature range of about 25° C. to about 150° C.

The dielectric constant depending on a temperature of the composite may satisfy Relationship Equations 1 and 2.

$$\varepsilon_1 - \varepsilon_0/\varepsilon_0 > 0 \quad \text{Relationship Equation 1—}$$

$$\varepsilon_2 - \varepsilon_0/\varepsilon_0 > 0 \quad \text{Relationship Equation 2—}$$

In Relationship Equations 1 and 2,
$\varepsilon_0$ is a dielectric constant of the composite at 25° C.,
$\varepsilon_1$ is a dielectric constant of the composite at 150° C., and
$\varepsilon_2$ is a dielectric constant of the composite at 200° C.

The dielectric constant depending on a temperature of the composite may satisfy Relationship Equation 3.

$$\varepsilon_2 - \varepsilon_1 > 0 \quad \text{Relationship Equation 3—}$$

In Relationship Equation 3,
$\varepsilon_1$ is a dielectric constant of the composite at 150° C., and
$\varepsilon_2$ is a dielectric constant of the composite at 200° C.

The composite may have a dielectric constant of greater than or equal to about 800 at each temperature of 25° C., 150° C., and 200° C.

According to an embodiment, a method of manufacturing a ceramic dielectric includes synthesizing a layered ceramic powder including strontium (Sr) and niobium (Nb), performing acid-exchange treatment of the layered ceramic powder, pressing the acid-treated ceramic powder to obtain a pellet, and sintering the pellet to obtain a composite comprising a first dielectric and a second dielectric and provide the ceramic dielectric, wherein each of the first dielectric and the second dielectric includes strontium (Sr) and niobium (Nb) and has a different crystal system.

The layered ceramic powder may be a layered perovskite.

The acid-exchange treatment may include supplying hydrochloric acid, nitric acid, sulfuric acid, or a combination thereof to the layered ceramic powder.

The sintering may include heat-treating at a first temperature and heat-treating at a second temperature that is lower than the first temperature, and the first temperature may range from about 1,000° C. to about 1,500° C.

The second temperature may range from about 500° C. to about 950° C.

The first dielectric may have a tetragonal system and the second dielectric may have an orthorhombic system.

According to an embodiment, a ceramic electronic component includes the ceramic dielectric.

The ceramic electronic component may include a multi-layer ceramic capacitor (MLCC) and the multi-layer ceramic capacitor (MLCC) may include a laminate structure comprising a plurality of unit capacitors each unit capacitor including a pair of electrodes and a dielectric layer including the ceramic dielectric.

According to an embodiment, a device includes the ceramic electronic component.

The dielectric may ensure a high dielectric constant and thermal stability.

DETAILED DESCRIPTION

Hereinafter, example embodiments of the present disclosure will be described in detail so that a person skilled in the art would understand the same. This disclosure may, however, be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

To provide an electronic device with improved performance, improved efficiency, and a relatively smaller size, a ceramic electronic component such as an MLCC with improved performance and a relatively smaller size, which may be disposed (e.g., mounted) in various devices, is desired. Thermal stability is also desired so that the MLCC may effectively be used in device exposed to high temperatures such as electronic components for vehicles.

Hereinafter, a ceramic dielectric according to an embodiment is described.

A ceramic dielectric according to an embodiment includes a composite of a plurality of dielectrics having a different crystal system. The plurality of dielectrics may be a metal oxide of a three-dimensional structure having a different composition.

For example, the composite may include a first dielectric and a second dielectric having a different crystal system wherein the first dielectric may have a tetragonal system and the second dielectric may have an orthorhombic system.

The first dielectric and the second dielectric may independently be a Sr—Nb—O based dielectric including strontium (Sr) and niobium (Nb) essentially. At least one of the first dielectric and the second dielectric may further include a different metal and/or semi-metal except, e.g., other than, strontium (Sr) and niobium (Nb), in addition to strontium (Sr) and niobium (Nb), and may further include for example barium (Ba). In the crystal system, barium (Ba) may partially substitute for a site of strontium (Sr), i.e., strontium (Sr) may be substituted with barium (Ba) at one or more strontium (Sr) sites but not all strontium (Sr) sites. At least one of the first dielectric and the second dielectric may further include a different metal and/or semi-metal except, i.e., other than, strontium (Sr), niobium (Nb), and barium (Ba), in addition to strontium (Sr), niobium (Nb), and barium (Ba).

For example, the first dielectric may be a Sr—Nb—O based dielectric having a tetragonal system and may be for example represented by $Sr_{1-a}Ba_aM_bNb_2O_6$ and/or $Sr_{6-}$ $_cBa_dM_dNb_{10}O_{30}$ and the second dielectric may be a Sr—Nb—O based dielectric having an orthorhombic system may be for example represented by $Sr_{2-2e}Ba_{2e}M_fNb_2O_7$. Herein, M may independently be the same or different, may be at least one metal or semi-metal except, i.e., other than, strontium (Sr), barium (Ba), and niobium (Nb), and may satisfy $0 \leq a<0.5, 0 \leq b \leq 3, 0 \leq c \leq 3, 0 \leq d \leq 3, 0 \leq e<0.5$, and $0 \leq f \leq 3$. M may include for example cobalt (Co), nickel (Ni), copper (Cu), zinc (Zn), manganese (Mn), magnesium (Mg), aluminum (Al), iron (Fe), scandium (Sc), gallium (Ga), lanthanum (La), yttrium (Y), bismuth (Bi), dysprosium (Dy), neodymium (Nd), samarium (Sm), holmium (Ho), cerium (Ce), europium (Eu), gadolinium (Gd), terbium (Tb), erbium (Er), thulium (Tm), ytterbium (Yb), ruthenium (Lu), or a combination thereof, but is not limited thereto.

For example, the first dielectric may include, or be represented by $Sr_{1-a}Ba_aNb_2O_6$ ($0 \leq a<0.5$) and/or $Sr_6Nb_{10}O_{30}$ and the second dielectric may include, or be represented by $Sr_2Nb_2O_7$.

The first dielectric and the second dielectric may be included in various fractions in the composite. For example, the first dielectric and the second dielectric may be included in a mole ratio of about 10:90 to about 90:10, for example about 20:80 to about 80:20, about 30:70 to about 70:30, about 40:60 to about 60:40, or about 50:50. For example, the first dielectric may be included in the same amount as or greater amount than the second dielectric. For example, the first dielectric and the second dielectric may be included in a mole ratio of about 50:50 to about 90:10, for example about 50:50 to about 70:30.

For example, the first dielectric and the second dielectric may be obtained from a single-phased ceramic powder simultaneously, for example from a single-phased layered ceramic powder simultaneously, and for example from a layered perovskite simultaneously.

The ceramic dielectric according to the present embodiment includes a composite of a plurality of dielectrics respectively having a different crystal system and thus may secure a high dielectric constant and in addition, reduce a dielectric constant change over a wide temperature range. Accordingly, the ceramic dielectric according to the present embodiment may be effectively applied to a ceramic electronic component applied to a device exposed to a high temperature.

For example, the composite may have a dielectric constant of greater than or equal to about 800 at room temperature (about 25° C.). Within the range, the composite may have a dielectric constant of greater than or equal to about 1,000, for example greater than or equal to about 1,200, greater than or equal to about 1,400, greater than or equal to about 1,600, greater than or equal to about 1,800, or greater than or equal to about 2,000 at room temperature (about 25° C.).

For example, the composite may have a dielectric constant of greater than or equal to about 800 from room temperature (about 25° C.) to about 200° C. Within the range, the composite may maintain a dielectric constant of greater than or equal to about 1,000, for example greater than or equal to about 1,200, greater than or equal to about 1,400, greater than or equal to about 1,600, greater than or equal to about 1,800, or greater than or equal to about 2,000 from room temperature (about 25° C.) to 200° C.

For example, a Curie temperature (Tc) of the composite may not be in a temperature range of about −55° C. to about 200° C. The Curie temperature (Tc) may be the temperature at which the ferroelectric phase is changed into the paraelectric phase, and the composite may lose ferroelectricity due to the phase transition of the dielectric near the Curie temperature. The Curie temperature (Tc) of the composite may not be in, i.e., may exclude a temperature range in which a ceramic electronic component is used, for example, in a range of less than or equal to about 200° C., for example, in a range of about −55° C. to about 200° C., and accordingly, a decrease, e.g., a sharp decrease, of the dielectric constant with a temperature change may be prevented, and the composite may be stable during use. The Curie temperature of the composite may be for example greater than or equal to about 300° C., for example greater than or equal to about 400° C., greater than or equal to about 500° C., greater than or equal to about 700° C., or greater than or equal to about 1,000° C.

For example, the dielectric constant of the composite may not substantially decrease but be substantially equivalent, e.g., constant, or increase according to a temperature increase in the temperature range of about 25° C. to about 200° C.

For example, a variation of the dielectric constant of the composite with a temperature increase in the temperature range of about 25° C. to about 200° C. may be in a range of greater than or equal to about 0 and less than or equal to about +75%.

For example, the variation of the dielectric constant of the composite may be in a range of greater than or equal to about 0 and less than or equal to about +25% in a temperature range of about 25° C. to about 150° C.

For example, variation of a dielectric constant with a change in temperature of the composite may satisfy Relationship Equations 1 and 2.

$$\varepsilon_1 - \varepsilon_0 / \varepsilon_0 > 0 \quad \text{Relationship Equation 1}$$

$$\varepsilon_2 - \varepsilon_0 / \varepsilon_0 > 0 \quad \text{Relationship Equation 2}$$

In Relationship Equations 1 and 2,
$\varepsilon_0$ is a dielectric constant of the composite at 25° C.,
$\varepsilon_1$ is a dielectric constant of the composite at 150° C., and
$\varepsilon_2$ is a dielectric constant of the composite at 200° C.

For example, in Relationship Equations 1 and 2, each of the dielectric constant at 25° C. ($\varepsilon_0$), the dielectric constant at 150° C. ($\varepsilon_1$), and the dielectric constant ($\varepsilon_2$) at 200° C. may be greater than or equal to about 800. For example, the dielectric constant at 25° C. ($\varepsilon_0$), the dielectric constant at 150° C. ($\varepsilon_1$), and the dielectric constant ($\varepsilon_2$) at 200° C. may be greater than or equal to about 1,200, greater than or equal to about 1,400, greater than or equal to about 1,600, greater than or equal to about 1,800, or greater than or equal to about 2,000.

For example, the composite satisfying Relationship Equation 1 and 2 may satisfy Relationship Equation 3.

$$\varepsilon_2 - \varepsilon_1 > 0 \quad \text{[Relationship Equation 3]}$$

In Relationship Equation 3,
$\varepsilon_1$ is a dielectric constant of the composite at 150° C., and
$\varepsilon_2$ is a dielectric constant of the composite at 200° C.

For example, the composite may have a resistivity of greater than or equal to about $1 \times 10^9$ ohm centimeter ($\Omega \cdot cm$), for example greater than or equal to about $5 \times 10^9$ $\Omega \cdot cm$, greater than or equal to about $1 \times 10^{10}$ $\Omega \cdot cm$, or greater than or equal to about $1 \times 10^{11}$ $\Omega \cdot cm$ at room temperature.

For example, the composite may have a resistivity of greater than or equal to about $0.5 \times 10^8$ $\Omega \cdot cm$ from room temperature (about 25° C.) to 200° C. Within the ranges, the composite may maintain a resistivity of greater than or equal to about $1 \times 10^8$ $\Omega \cdot cm$, for example greater than or equal to about $1 \times 10^9$ $\Omega \cdot cm$ from room temperature (about 25° C.) to 200° C.

Hereinafter, a method of manufacturing a ceramic dielectric according to an embodiment is described.

A method of manufacturing a ceramic dielectric according to an embodiment includes synthesizing a layered ceramic powder including strontium (Sr) and niobium (Nb), performing acid-exchange treatment of the layered ceramic powder, pressing the acid-treated ceramic powder to obtain a pellet, and sintering the pellet to obtain a composite of a first dielectric and a second dielectric wherein each of the first dielectric and the second dielectric includes strontium (Sr) and niobium (Nb) and has a different crystal system.

First, the layered ceramic powder may be for example obtained through a solid phase synthesis. The layered ceramic powder may be obtained by heat-treating a mixture including a metal precursor including for example a strontium precursor and a niobium precursor and an alkaline metal compound, an alkaline-earth metal compound, or a combination thereof.

The strontium precursor may be for example strontium oxide, a strontium carbonate salt, strontium hydroxide, or a combination thereof, for example $SrCO_3$, $SrO$, $Sr(OH)_2$, or a combination thereof and the niobium precursor may be for example niobium oxide, a niobium carbonate salt, niobium hydroxide, or a combination thereof, for example $Nb_2O_5$, $Nb_2(CO_3)_5$, $Nb(OH)_5$, or a combination thereof, but is not limited thereto.

At least one additional metal precursor may be included in addition to the strontium precursor and the niobium precursor, for example a barium precursor. The barium precursor may be for example barium oxide, a barium carbonate salt, barium hydroxide, or a combination thereof for example $BaCO_3$, $BaO$, $Ba(OH)_2$, or a combination thereof, but is not limited thereto.

At least one additional metal precursor may be included in addition to the strontium precursor, the niobium precursor, and a barium precursor, and may for example further include a cobalt precursor, a nickel precursor, a copper precursor, a zinc precursor, a manganese precursor, a magnesium precursor, an aluminum precursor, an iron precursor, a scandium precursor, a gallium precursor, a lanthanum precursor, a yttrium precursor, a bismuth precursor, a dysprosium precursor, a neodymium precursor, a samarium precursor, a holmium precursor, a cerium precursor, an europium precursor, a gadolinium precursor, a terbium precursor, an erbium precursor, a thulium precursor, a ytterbium precursor, a ruthenium precursor, or a combination thereof, but is not limited thereto.

The alkaline metal compound, the alkaline-earth metal compound, or the combination thereof may be for example a compound including Ca, K, or a combination thereof and may be for example $CaCO_3$, $K_2CO_3$, and the like, but is not limited thereto.

A mixing ratio of the metal precursor and the alkaline metal compound, the alkaline-earth metal compound, or the combination thereof may be selected considering a composition of the composite to be prepared. For example, the alkaline metal compound, the alkaline-earth metal compound, or the combination thereof may be mixed in an amount of about 0.1 moles (mol) to about 1 mol, per 1 mol of the metal precursor, but is not limited thereto. The heat treatment may be performed, for example, under an inert atmosphere such as a nitrogen atmosphere, an argon atmosphere, or vacuum, or in air at about 700° C. to about 1,800° C. for about 5 hours to about 50 hours but is not limited thereto.

Subsequently, the layered ceramic powder obtained through the heat treatment is cooled down to room temperature (about 25° C.) and then, ground and thus prepared as a fine layered ceramic powder. The layered ceramic powder may have a three dimensional structure formed of a plurality of relatively thin sheet-shaped dielectric precursors and an alkali metal, an alkaline-earth metal, or a combination thereof disposed among the relatively thin sheet-shaped dielectric precursors. The alkali metal, the alkaline-earth metal, or the combination thereof (M) may be present in a form of a metal cation. The layered ceramic powder may be for example a layered perovskite, but is not limited thereto.

Next, the layered ceramic powder is subjected to acid-exchange treatment to obtain a layered proton-exchanged ceramic material in which at least one part of an alkali metal and/or an alkaline-earth metal in the layered ceramic powder is changed into a proton ($H^+$) and/or a hydronium ion ($H_3O^+$).

The acid-exchange treatment may include supplying an acid solution to the layered ceramic powder, for example supplying hydrochloric acid, nitric acid, sulfuric acid, or a combination thereof to the layered ceramic powder. A concentration of the acid solution, a temperature of the acid-exchange treatment, and a time of the acid-exchange treatment may be appropriately selected and are not particularly limited.

Next, the acid-exchange treated ceramic powder may be molded and pressed to obtain a pellet. The pellet may be for example obtained from room temperature to about 80° C. and at a pressure of about 100 MPa to about 500 MPa and may have for example a height of about 0.5 millimeters (mm) to about 3 mm and a width of about 3 mm to about 30 mm.

Next, the obtained pellet is sintered to obtain a composite including dielectrics having a different crystal system. The sintering may be continuously performed under different atmospheres and/or at different temperatures and, for example, include a primary heat treatment under a reducing atmosphere at a first temperature and a secondary heat treatment under an oxidizing atmosphere at a lower second temperature than the first temperature.

The reducing atmosphere and the oxidizing atmosphere may independently be a dry gas atmosphere such as dry $H_2$ gas, a dry $H_2/N_2$ mixed gas atmosphere, and dry air, wet gas atmosphere such as a wet $N_2$ atmosphere, air, or a combination thereof. For example, the reducing atmosphere may be 100% dry $H_2$ gas or dry a $H_2/N_2$ mixed gas atmosphere of a $H_2:N_2$ volume ratio of, for example about 1:99 to about 99:1, about 10:90 to about 90:10, about 20:80 to about 80:20, about 30:70 to about 70:30, about 40:60 to about 60:40, or about 50:50 and the oxidizing atmosphere may be a dry air atmosphere or a 100% wet $N_2$ gas or a wet $N_2/H_2$ mixed gas atmosphere of a $H_2:N_2$ volume ratio of, for example about 1:99 to about 99:1, about 10:90 to about 90:10, about 20:80 to about 80:20, about 30:70 to about 70:30, about 40:60 to about 60:40, or about 50:50. Reducing and re-oxidizing may independently be performed for about 1 hour to about 6 hours, for example about 2 hours to about 4 hours.

The first temperature may range from about 1,000° C. to about 1,500° C. and the second temperature may range from about 500° C. to about 950° C.

For example, the primary heat treatment may be performed, for example, under a $H_2/N_2$ mixed gas atmosphere at about 1,100° C. to about 1,400° C., and the secondary heat treatment may be performed, for example, under an air and/or wet $N_2$ atmosphere at about 600° C. to about 950° C. Within the ranges, the reduction may be performed in a range of about 1,200° C. to about 1,300° C., and the oxidizing may be performed, for example, in a range of about 650° C. to about 900° C. In the primary and secondary heat treatments, heat treatment temperature and time may be variously adjusted depending on a dielectric constant and resistivity.

During the sintering, a sintering additive (sintering agent) may be further added and the sintering additive may be for example an oxide or glass compound including Si, Mn, Al, Fe, Zn, Ga, Dy, In, or a combination thereof, but is not limited thereto.

The obtained composite may include a first dielectric and a second dielectric having a different crystal system, for example a first dielectric having a tetragonal system and a second dielectric having an orthorhombic system, for example a first dielectric having a tetragonal system represented by $Sr_{1-a}Ba_aM_bNb_2O_6Sr_{6-c}Ba_cM_dNb_{10}O_{30}$, or a combination thereof and a second dielectric having an orthorhombic system represented by $Sr_{2-2e}Ba_{2e}M_fNb_2O_7$.

In this way, the composite including a plurality of dielectrics having a different crystal system may be obtained by a phase transition by sintering the single-phased ceramic powder that is subjected to the acid-exchange treatment, at a high temperature.

Herein, without being bound to specific theory, it is expected that the phase transition may be obtained by the following Reaction Schemes.

The composite is the same as described above.

The composite may be applied to various ceramic electronic components.

Figure 1:
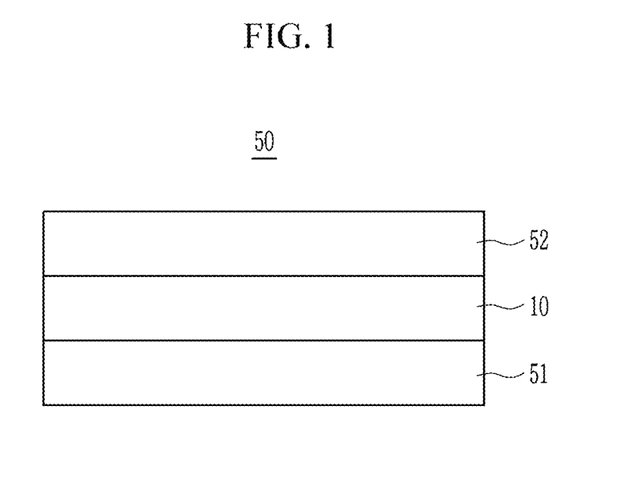
FIG. 1 is a schematic view of a ceramic electronic component according to an embodiment.

FIG. 1 is a schematic view of a ceramic electronic component according to an embodiment.

FIG. 1 shows a capacitor 50 that is an example of the ceramic electronic component.

Referring to FIG. 1, a capacitor 50 according to an embodiment includes a pair of electrodes 51 and 52 facing each other and a ceramic dielectric 10.

The pair of electrodes 51 and 52 may include a conductor such as a metal, for example nickel (Ni), gold (Au), platinum (Pt), palladium (Pd), copper (Cu), silver (Ag), tin (Sn), an alloy thereof, or a combination thereof, but are not limited thereto. The pair of electrodes 51 and 52 may be for example a metal plate, a conductive layer disposed on a substrate, or a metal-plated plate on a substrate. Herein, the substrate may be for example a glass substrate, a semiconductor substrate, a polymer substrate, or a combination thereof, but is not limited thereto.

The ceramic dielectric 10 is the same as described above.

Figure 2:
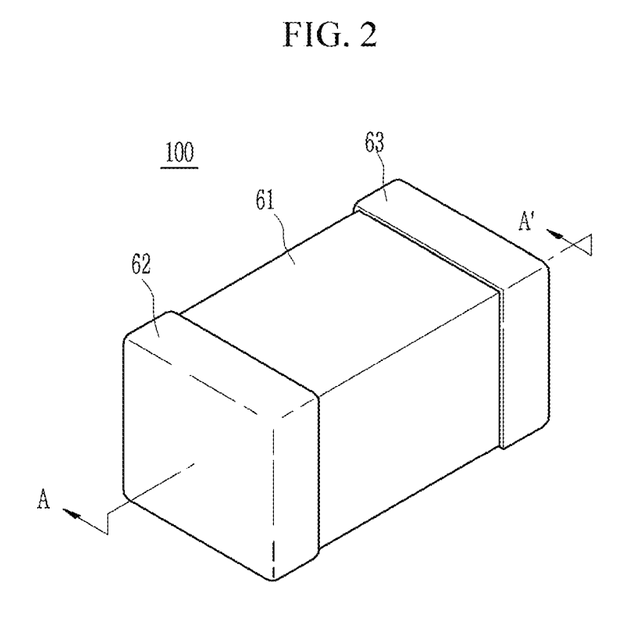
FIG. 2 is a schematic perspective view of a ceramic electronic component according to an embodiment.
Figure 3:
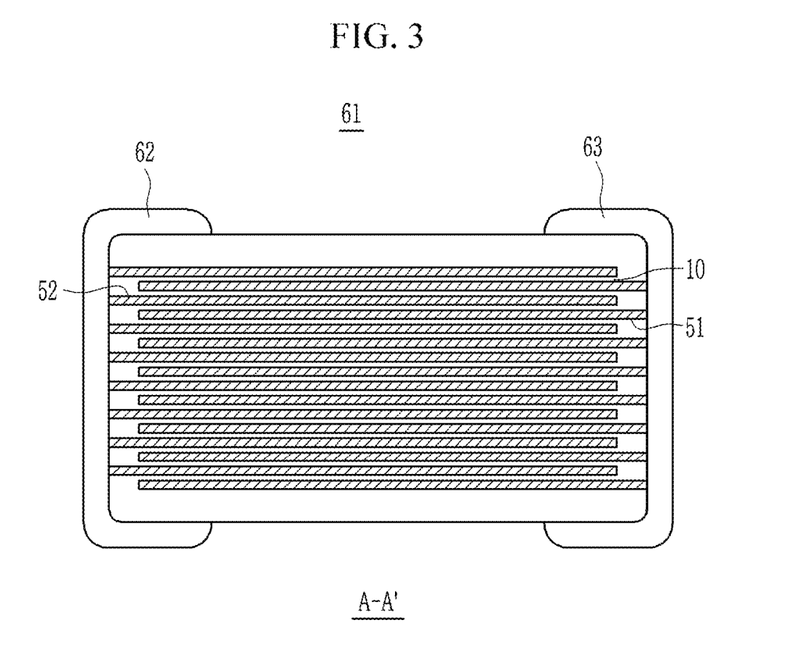
FIG. 3 is a cross-sectional view of the ceramic electronic component shown in FIG. 2 taken along an A-A' direction.

FIG. 2 is a schematic perspective view of a ceramic electronic component according to an embodiment and FIG. 3 is a cross-sectional view of the ceramic electronic component of FIG. 2 taken along the A-A' direction.

The ceramic electronic component according to the present embodiment multi-layer ceramic capacitor (MLCC) 100 having a laminate structure wherein a plurality of the capacitors of FIG. 1 are laminated as a unit capacitor.

Referring to FIGS. 2 and 3, the multilayer ceramic capacitor 100 includes a capacitor body 61 and external electrodes 62 and 63. The capacitor body 61 may have a laminate structure wherein a plurality of the capacitors 50 of FIG. 1 are laminated, and each of the capacitors includes the electrodes (internal electrodes) 51 and 52 and the ceramic dielectric 10 as described above. The details therefor are the same as described above.

As one example of the ceramic electronic component, a capacitor and a multi-layer ceramic capacitor are described above, but the present disclosure is not limited thereto, and it may be applied for all electronic components using ceramic such as a piezoelectric device, a varistor, or a thermistor, etc.

The ceramic electronic component such as the capacitor and the multi-layer ceramic capacitor may be included in a variety of devices, for example, may be employed for an image device such as a liquid crystal display (LCD), an electronic device such as a computer, a mobile phone, or the like, and a vehicle device such as an electric vehicle and a smart car.

Hereinafter, the embodiments are illustrated in more detail with reference to examples. However, these examples are exemplary and the scope of the present disclosure is not limited thereto.

SYNTHESIS EXAMPLES

Synthesis Example 1

$K_2CO_3$:$SrCO_3$:$Nb_2O_5$ are mixed in a mole (mol) ratio of K:Sr:Nb=1.1:2:3, and ethanol and zirconia ball media are added thereto to ball-mill the mixture for 24 hours. Subsequently, the mixed powder are dried in a beaker with a magnetic bar and a hot plate, while mixed. The dried powder is put in an alumina crucible and heat-treated at 1,200° C. in a furnace under an air atmosphere. When the furnace is cooled down to room temperature, the alumina crucible is taken out therefrom, and the heat-treated $KSr_2Nb_3O_{10}$ powder is ground to prepare a fine powder.

Subsequently, the obtained fine $KSr_2Nb_3O_{10}$ powder is added to a 5 molar (M) $HNO_3$ solution, and the mixture is stirred for 3 days and filtered to ion-exchange an intercalant (K) with a proton ($H^+$) and thus obtain $HSr_2Nb_3O_{10}$·$1.5H_2O$ powder. Subsequently, the $HSr_2Nb_3O_{10}$·$1.5H_2O$ powder is molded into a pellet having a height of 1 millimeters (mm) and a diameter of 10 mm by using a die having a diameter of 10 mm. The pellet is reduced under a dry 1% $H_2/N_2$ atmosphere at 1250° C. for 2 hours and reoxidized under a dry air atmosphere at 900° C. for 2 hours to obtain a composite of $Sr_6Nb_{10}O_{30}$ and $Sr_2Nb_2O_7$.

Synthesis Example 2

$K_2CO_3$:$SrCO_3$:$BaCO_3$:$Nb_2O_5$ are mixed in a mol ratio of K:Sr:Ba:Nb=1.1:1.8:0.2:3, and ethanol and zirconia ball media are added thereto to ball-mill the mixture for 24 hours. Subsequently, the mixed powder is dried in a beaker by using a magnetic bar and a hot plate, while mixed. The dried powder is put in an alumina crucible and heat-treated at 1,200° C. in a furnace under an air atmosphere. When the furnace is cooled down to room temperature, the alumina crucible is taken out therefrom, and the $KSr_{1.8}Ba_{0.2}Nb_3O_{10}$ powder is ground to prepare a fine powder.

Subsequently, the fine $KSr_{1.8}Ba_{0.2}Nb_3O_{10}$ powder is put in a 5 M $HNO_3$ solution, and the mixture is stirred for 3 days and filtered to ion-exchange an intercalant (K) with a proton ($H^+$) and thus obtain $HSr_{1.8}Ba_{0.2}Nb_3O_{10}$·$1.5H_2O$ powder. Subsequently, the obtained $HSr_{1.8}Ba_{0.2}Nb_3O_{10}$·$1.5H_2O$ powder is molded into a pellet having a height of 1 mm and a diameter of 10 mm by using a die having a diameter of 10 mm. The pellet is reduced under a dry 1% $H_2/N_2$ atmosphere at 1250° C. for 2 hours and reoxidized under a dry air atmosphere at 700° C. for 2 hours to obtain a composite of $(Sr_{0.86}Ba_{0.14})Nb_2O_6$ and $Sr_2Nb_2O_7$.

Synthesis Example 3

A composite of $(Sr_{0.86}Ba_{0.14})Nb_2O_6$ and $Sr_2Nb_2O_7$ is obtained according to the same method to Synthesis Example 2 except for reducing the pellet under a dry 1% $H_2/N_2$ atmosphere at 1250° C. for 2 hours and reoxidizing it under a dry air atmosphere at 900° C. for 2 hours.

Synthesis Example 4

$K_2CO_3$:$SrCO_3$:$BaCO_3$:$Nb_2O_5$ are mixed in a mol ratio of K:Sr:Ba:Nb=1.1:1.6:0.4:3, and ethanol and zirconia ball media are added thereto to ball-mill the mixture for 24 hours. Subsequently, the mixed powder is dried in a beaker with a magnetic bar and a hot plate, while mixed. The dried powder is put in an alumina crucible and heat-treated at 1,200° C. in a furnace under an air atmosphere. When the furnace is cooled down to room temperature, the alumina crucible is taken out therefrom, and the $KSr_{1.6}Ba_{0.4}Nb_3O_{10}$ powder is ground to prepare a fine powder.

Subsequently, the fine $KSr_{1.6}Ba_{0.4}Nb_3O_{10}$ powder is put in a 5 M $HNO_3$ solution, and the mixture is stirred for 3 days and filtered to ion-exchange an intercalant (K) with a proton ($H^+$) and thus obtain $HSr_{1.6}Ba_{0.4}Nb_3O_{10} \cdot 1.5H_2O$ powder. Subsequently, the $HSr_{1.6}Ba_{0.4}Nb_3O_{10} \cdot 1.5H_2O$ powder is molded into a pellet having a height of 1 mm and a diameter of 10 mm by using a die having a diameter of 10 mm. The pellet is reduced under a dry 1% $H_2/N_2$ atmosphere at 1250° C. for 2 hours and reoxidized under a dry air atmosphere at 900° C. for 2 hours to obtain a composite of $(Sr_{0.75}Ba_{0.25})Nb_2O_6$ and $Sr_2Nb_2O_7$.

Evaluation I

Crystal systems of the composites obtained in Synthesis Examples 1 to 4 are confirmed.

The crystal systems of the composites are confirmed using an X-ray diffraction (XRD) (D8 Advance, Bruker, Germany).

Figure 4:
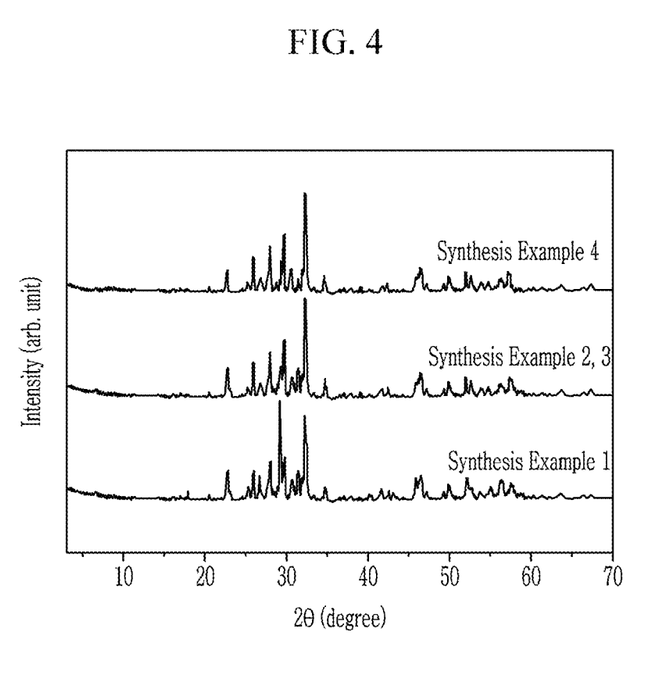
FIG. 4 is an X-ray diffraction (XRD) graph of the composites according to Synthesis Examples 1 to 4.

FIG. 4 is an XRD graph showing the composites according to Synthesis Examples 1 to 4.

Referring to FIG. 4, the composites obtained in Synthesis Examples 1 to 4 have two phases having a different crystal system, and specifically, Table 1 shows the crystal systems and ratios.

TABLE 1

| | Crystal System | | Mole ratio of phases of composite Tetragonal/ |
|---|---|---|---|
| | Tetragonal | Orthorhombic | Orthorhombic (mol %) |
| Synthesis Example 1 | $Sr_6Nb_{10}O_{30}$ | $Sr_2Nb_2O_7$ | 50/50 |
| Synthesis Example 2 | $(Sr_{0.86}Ba_{0.14})Nb_2O_6$ | $Sr_2Nb_2O_7$ | 70/30 |
| Synthesis Example 3 | $(Sr_{0.86}Ba_{0.14})Nb_2O_6$ | $Sr_2Nb_2O_7$ | 70/30 |
| Synthesis Example 4 | $(Sr_{0.75}Ba_{0.25})Nb_2O_6$ | $Sr_2Nb_2O_7$ | 60/40 |

Evaluation II

A crystal distribution of the composite obtained in Synthesis Example 3 is confirmed.

The crystal distribution is confirmed by using a scanning electron microscope (SEM) (Nova NanoSEM 450, FEI).

Figure 5:
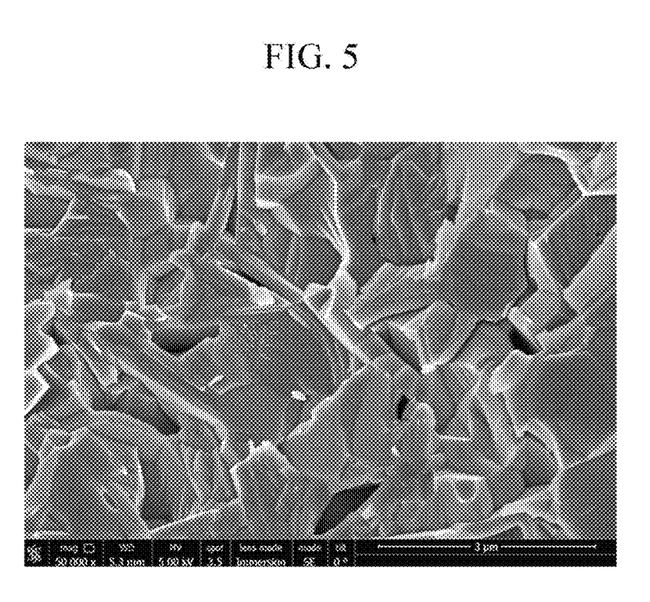
FIG. 5 is a scanning electron microscope (SEM) photograph of the composite obtained in Synthesis Example 3.

FIG. 5 is a SEM photograph showing the composite obtained in Synthesis Example 3.

Referring to FIG. 5, grains having a different crystal system are distributed in the composite obtained in Synthesis Example 3, and the grains have an average size ranging from about 1 micrometers (μm) to 2 μm.

EXAMPLES

Example 1

A capacitor is manufactured by coating In—Ga on both surfaces of the composite according to Synthesis Example 1 to form an electrode.

Example 2

A capacitor is manufactured by coating In—Ga on both surfaces of the composite according to Synthesis Example 2 to form an electrode.

Example 3

A capacitor is manufactured by coating In—Ga on both surfaces of the composite according to Synthesis Example 3 to form an electrode.

Example 4

A capacitor is manufactured by coating In—Ga on both surfaces of the composite according to Synthesis Example 4 to form an electrode.

Comparative Example 1

A capacitor is manufactured by coating In—Ga on both surfaces of a $BaTiO_3$ dielectric to form an electrode.

Evaluation III

Variation of dielectric constants with a change in temperature of the capacitors according to Examples 1 to 3 and Comparative Example 1 are evaluated.

The dielectric constants are evaluated using E4980A Precision LCR Meter (Keysight).

Figure 6:
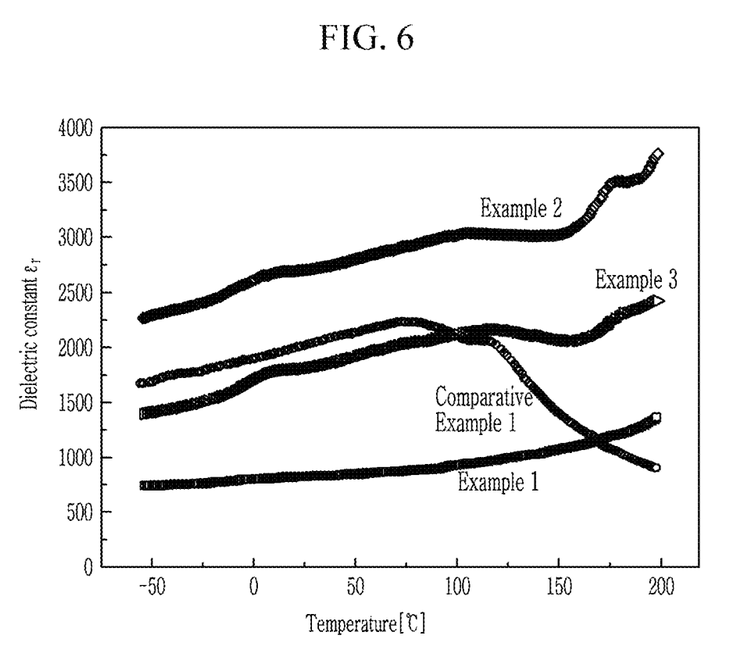
FIG. 6 is a graph showing variation of dielectric constants with a change in temperature of the capacitors according to Examples 1 to 3 and Comparative Example 1.

The results are shown in FIG. 6 and Table 2.

FIG. 6 is a graph showing variation of a dielectric constant with a change in temperature of the capacitors according to Examples 1 to 3 and Comparative Example 1.

TABLE 2

| | Dielectric Constant ($\in_r$) | | | | |
|---|---|---|---|---|---|
| | @25° C. | @85° C. | @125° C. | @150° C. | @200° C. |
| Example 1 | 811 | 881 | 984 | 1055 | 1353 |
| Example 2 | 2701 | 2951 | 3025 | 3014 | 3770 |
| Example 3 | 1811 | 2065 | 2146 | 2078 | 2425 |
| Comparative Example 1 | 2008 | 2211 | 1945 | 1440 | 895 |

Referring to FIG. 6 and Table 2, the capacitors according to Examples 1 to 3 exhibit a dielectric constant that is maintained or increased with a higher temperature, while the capacitor according to Comparative Example 1 exhibit a dielectric constant that is decreased around 120° C., a Curie temperature (Tc) of $BaTiO_3$, and then, decreased further, with the higher temperature.

Accordingly, a dielectric used in the capacitors according to Examples 1 to 3, that is, the composites according to Synthesis Examples 1 to 3 have no Curie temperature in a temperature range of about −55° C. to 200° C. Accordingly, the capacitors according to Examples 1 to 3 exhibit high stability at a high temperature.

Evaluation IV

Variation of resistivity of the capacitors according to Examples 2 and 3 with a change in temperature is evaluated.

Resistivity is evaluated by using Keithley 2400 SourceMeter (Tektronix).

The results are shown in Table 3.

TABLE 3

| | Resistivity (Ω · cm) | | | | |
|---|---|---|---|---|---|
| | @25° C. | @85° C. | @125° C. | @150° C. | @200° C. |
| Example 2 | $1.1 \times 10^{10}$ | — | $9.1 \times 10^{9}$ | $6.1 \times 10^{9}$ | $1.2 \times 10^{8}$ |
| Example 3 | $3.2 \times 10^{11}$ | $3.9 \times 10^{11}$ | $3.5 \times 10^{11}$ | $1.8 \times 10^{11}$ | $1.4 \times 10^{10}$ |

Referring to Table 3, the capacitors according to Examples 2 and 3 exhibit no large resistivity decrease with a temperature change.

Evaluation V

Variations of capacitances of the capacitors according to Examples 1 to 3 and Comparative Example 1 with a change in temperature are evaluated.

The capacitances are evaluated by using E4980A Precision LCR Meter (Keysight), and the capacitance variation is evaluated as a variation of each capacitance relative to the capacitance at room temperature (25° C.).

Figure 7:
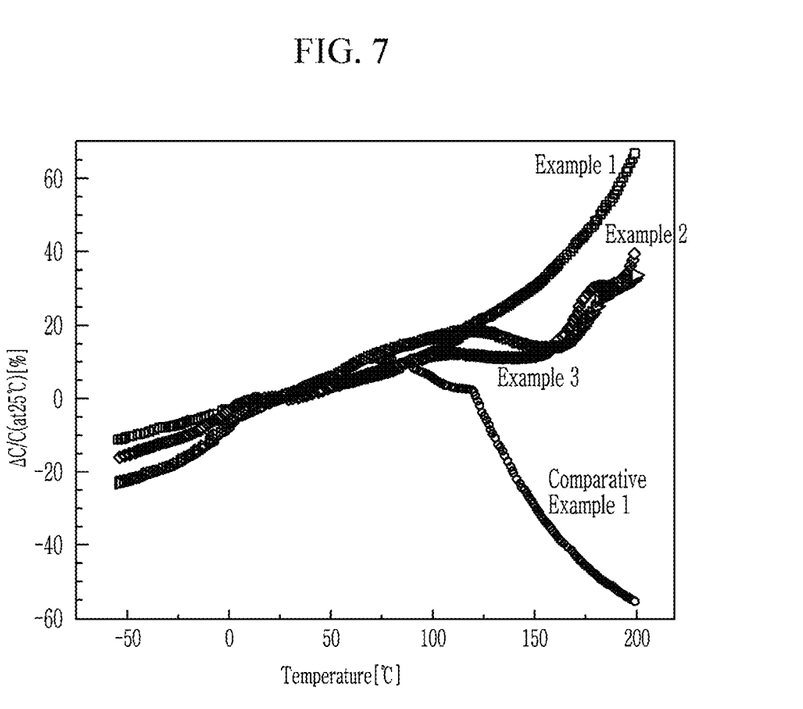
FIG. 7 is a graph showing variations of capacitances with a change in temperature of the capacitors according to Examples 1 to 3 and Comparative Example 1.

The results are shown in FIG. 7.

FIG. 7 is a graph showing variations of capacitances of the capacitors according to Examples 1 to 3 and Comparative Example 1 with a change in temperature.

Referring to FIG. 7, the capacitors according to Examples 1 to 3 exhibit no capacitance decrease in a temperature range of 25° C. to 200° C., but the capacitor according to Comparative Example 1 exhibit a large capacitance decrease in the temperature range.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A ceramic dielectric comprising
a composite comprising a first dielectric and a second dielectric,
wherein each of the first dielectric and the second dielectric comprises strontium and niobium and has a different crystal system.

2. The ceramic dielectric of claim 1, wherein the first dielectric has a tetragonal system and the second dielectric has an orthorhombic system.

3. The ceramic dielectric of claim 2, wherein the first dielectric comprises $Sr_{1-a}Ba_aM_bNb_2O_6$ or $Sr_{6-c}Ba_cM_dNb_{10}O_{30}$, and
the second dielectric comprises $Sr_{2-2e}Ba_{2e}M_fNb_2O_7$,
wherein each M is independently at least one metal or semi-metal other than strontium, barium, and niobium, and
$0 \leq a < 0.5$, $0 \leq b \leq 3$, $0 \leq c \leq 3$, $0 \leq d \leq 3$, $0 \leq e < 0.5$, and $0 \leq f \leq 3$.

4. The ceramic dielectric of claim 3, wherein M comprises at least one of cobalt, nickel, copper, zinc, manganese, magnesium, aluminum, iron, scandium, gallium, lanthanum, yttrium, bismuth, dysprosium, neodymium, samarium, holmium, cerium, europium, gadolinium, terbium, erbium, thulium, ytterbium, ruthenium, or a combination thereof.

5. The ceramic dielectric of claim 3, wherein the first dielectric comprises $Sr_{1-a}Ba_aNb_2O_6$ or $Sr_6Nb_{10}O_{30}$, and
the second dielectric comprises $Sr_2Nb_2O_7$.

6. The ceramic dielectric of claim 2, wherein the first dielectric and the second dielectric are present in a mole ratio of about 50:50 to about 90:10.

7. The ceramic dielectric of claim 1, wherein a Curie temperature of the composite is not in a temperature range of about −55° C. to about 200° C.

8. The ceramic dielectric of claim 1, wherein a variation of a dielectric constant of the composite is less than or equal to about 25% in a temperature range of about 25° C. to about 150° C.

9. The ceramic dielectric of claim 1, wherein a dielectric constant depending on a temperature of the composite satisfies Relationship Equations 1 and 2 are satisfied:

$$\varepsilon_1 - \varepsilon_0 / \varepsilon_0 > 0 \qquad \text{Relationship Equation 1}$$

$$\varepsilon_2 - \varepsilon_0 / \varepsilon_0 > 0 \qquad \text{Relationship Equation 2}$$

wherein, in Relationship Equations 1 and 2,
$\varepsilon_0$ is a dielectric constant of the composite at 25° C.,
$\varepsilon_1$ is a dielectric constant of the composite at 150° C., and
$\varepsilon_2$ is a dielectric constant of the composite at 200° C.

10. The ceramic dielectric of claim 9, wherein the dielectric constant depending on a temperature of the composite satisfies Relationship Equation 3 is satisfied:

$$\varepsilon_2 - \varepsilon_1 > 0 \qquad \text{Relationship Equation 3}$$

wherein, in Relationship Equation 3,
$\varepsilon_1$ is a dielectric constant of the composite at 150° C., and
$\varepsilon_2$ is a dielectric constant of the composite at 200° C.

11. The ceramic dielectric of claim 9, wherein the composite has a dielectric constant of greater than or equal to about 800 at each temperature of 25° C., 150° C., and 200° C.

12. A method of manufacturing a ceramic dielectric, comprising
synthesizing a layered ceramic powder comprising strontium and niobium,
performing acid-exchange treatment of the layered ceramic powder,
pressing the acid-treated ceramic powder to obtain a pellet, and
sintering the pellet to obtain the ceramic dielectric comprising a composite comprising a first dielectric and a second dielectric, wherein each of the first dielectric and the second dielectric comprises strontium and niobium and has a different crystal system.

13. The method of claim 12, wherein the layered ceramic powder is a layered perovskite.

14. The method of claim 12, wherein the acid-exchange treatment comprises supplying hydrochloric acid, nitric acid, sulfuric acid, or a combination thereof to the layered ceramic powder.

15. The method of claim 12, wherein the sintering comprises heat-treating at a first temperature and heat-treating at a second temperature that is lower than the first temperature, and
the first temperature ranges from about 1,000° C. to about 1,500° C.

16. The method of claim 15, wherein the second temperature ranges from about 500° C. to about 950° C.

17. The method of claim 12, wherein the first dielectric has a tetragonal system and the second dielectric has an orthorhombic system.

18. A ceramic electronic component comprising the ceramic dielectric of claim 1.

19. The ceramic electronic component of claim 18, wherein the ceramic electronic component comprises a multi-layer ceramic capacitor, and the multi-layer ceramic capacitor comprises a laminate structure comprising a plurality of unit capacitors, each unit capacitor comprising a pair of electrodes and a dielectric layer comprising the ceramic dielectric.

20. A device comprising the ceramic electronic component of claim 18.

* * * * *